United States Patent [19]

Kruppa

[11] Patent Number: 5,087,867
[45] Date of Patent: Feb. 11, 1992

[54] MOTOR DRIVING APPARATUS AND PRINTER

[75] Inventor: Robert W. Kruppa, Cary, N.C.

[73] Assignee: International Business Machines Corporation, Armonk, N.Y.

[21] Appl. No.: 660,460

[22] Filed: Feb. 25, 1991

[51] Int. Cl.$^5$ .............................................. H02P 8/00
[52] U.S. Cl. ................................................. 318/696
[58] Field of Search ................. 318/34, 51, 53, 102, 318/103, 110, 112, 685, 696

[56] References Cited

U.S. PATENT DOCUMENTS

| | | | |
|---|---|---|---|
| 3,887,796 | 6/1975 | Trousdale et al. | 318/696 |
| 4,039,127 | 8/1977 | Huffhines et al. | 318/415 X |
| 4,055,786 | 10/1977 | DiMarzio | 318/562 |
| 4,329,633 | 5/1982 | Dunfield | 318/612 |
| 4,341,982 | 7/1982 | Lahti et al. | 318/51 |
| 4,638,222 | 1/1987 | Sawaki | 318/111 |
| 4,641,069 | 2/1987 | Fujioka et al. | 318/625 |
| 4,871,953 | 10/1989 | Anstee | 318/466 |

*Primary Examiner*—Bentsu Ro
*Attorney, Agent, or Firm*—Joscelyn G. Cockburn

[57] ABSTRACT

An apparatus which controls a plurality of motors and/or print heads, such as motors used in printers or the like, includes a microprocessor which outputs selection signals on one of its output pins. The signal is multiplexed through a plurality of frequency response switches to select one of the motors. Thereafter, the selected motor is energized by a common set of drivers which are activated by control signals that are outputted on other output pins of the microprocessor.

18 Claims, 8 Drawing Sheets

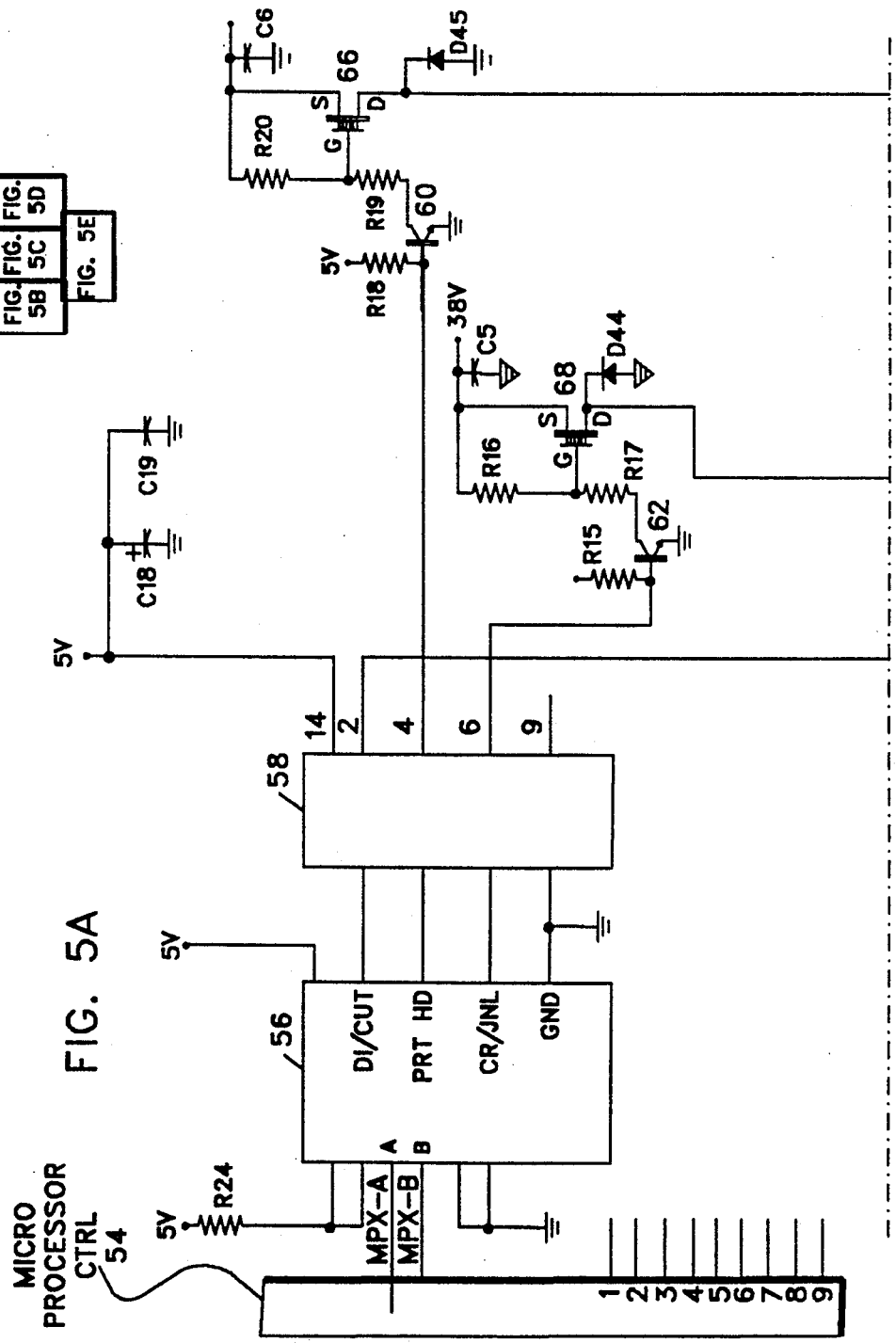

1

MOTOR DRIVING APPARATUS AND PRINTER

BACKGROUND OF THE INVENTION

1. Field of the Invention

The present invention relates to motor control systems in general and in particular to motor control systems wherein a single motor controller is time shared among multiple stepper motors.

2. Background of the Invention

Stepper motors are commonly used in manufacturing, industrial processes and as components in a variety of electro-mechanical devices. The motors are used to perform a range of functions from automating processes to positioning work items relative to processing stations. Usually, a plurality of motors are required to effectuate a desired result. For example, in a point-of-sale printer and other paper handling devices, several stepper motors are used to drive customer receipts, journals, document paper feed mechanisms, etc.

A stepper motor is an electro-mechanical device which includes a rotor and a stator. The stator carries a plurality of windings which can be energized singly or in groups to rotate the rotor a precise increment of a complete cycle. The precise increment is used to produce useful work.

If a single motor is used, a motor controller is required to generate current which energizes the motor windings. If multiple motors are used, which is usually the case, the motor contorller must not only generate the current that energizes the windings, but it must also select the proper motor whose windings or coils are to be energized. The prior art provides several types of motor controllers which can be used to control multiple stepper motors.

U.S. Pat. No. 4,742,287 provides a motor controller for a printer. The motor controller consists of a CPU which outputs simplex selection signals on several of its output pins. The simplex signal on each of the related output pins selects one of a plurality of motors. The selected motor is then energized by drivers which are connected to other output pins of the microprocessor. The drawback with this controller is that it requires dedicated simplex lines and associated circuitry for selecting a motor. In order to minimize cost, CPUs which are used as motor controllers have a limited number of output pins which provide the motor selection signals and the motor drive signals. If too many of the pins are used to provide motor selection signals, there will not be enough pins to provide the drive signals and visa versa. The net result is that the simplex technique of selecting a motor is not economical and/or practical.

U.S. Pat. No. 4,055,786 describes a motor control system wherein a motor controller generates a plurality of drive signal which are through individual diode arrays to energize the coils of a selected motor. Motor selection signals are fed from separate output terminals of a command unit computer. The drawback with this system is that each motor requires a separate diode array for activating its coils and a simplex line for its selection.

U.S. Pat. No. 3,792,332 describes a control interface unit consisting of a plurality of address lines, control lines and decoders to address a particular device and device driver. A control box or computer generates control signals which energize the respective lines. This technique requires several lines from the computer and a fair amount of external logic which interface the computer to the motors. As discussed above, the majority of the computer controllers do not have enough output lines and output pins to use the described technique.

U.S. Pat. No. 3,486,093 describes a motor control system consisting of a computer, stepper motor selection circuits and a plurality of drive circuits. Each motor receives energization and selection signal from dedicated circuits.

U.S. Pat. No. 3,448,361 describes a control system wherein separate loads are connected through separate SCR and bandpass filters and separate decoupler circuits to a common power supply line. The bandpass filters capture control signals which are generated and outputted on the power lines.

U.S. Pat. No. 3,416,053 describes a control circuit with different sets of drivers and different motor select lines for controlling a plurality of motors.

SUMMARY OF THE INVENTION

It is a general object of the present invention to provide a more efficient motor control apparatus than has heretofore been possible. The motor control apparatus embodies a multiplexing scheme which uses a single set of drivers and a single processor port pin to control and select one of a plurality of motors. By comparison to other known techniques, the multiplexing scheme results in an overall cost reduction, card area reduction, and more reliable circuit card due to the lower numbers of required high current drivers.

More particularly, the motor control apparatus includes a stored programmed microprocessor which is programmed to output a "motor selection signal" on one of its output pins and a set of energization signals on other ones of its output pins. The motor selection signal is generated at different frequencies.

A plurality of frequency response switches interconnect the microprocessor pin which carries the motor selection signal to a plurality of multiplexor FET drivers. Each multiplexor FET driver has one terminal which is connected to a power supply and another terminal which is connected to the coils of a stepper motor. Each coil of the stepper motor is connected to separate output pins of the microprocessor by a separate series connected diode/FET drive circuit. Each of the coils in each motor is provided with a separate discharge or feedback path which includes a common Zener diode connected in series with a regular diode. The regular diodes in non-energized coils act as blocking diodes to eliminate cross-talk between circuits.

In operation, the microprocessor is programmed to output a multifrequency "motor select signal" on one of its output pins. Each frequency selects a switch when the frequency on one of its input pins is within the range of frequencies for that particular switch. The generated DC signal activates an FET driver to which it is connected. The FET driver then selects the motor to which it is connected. Simultaneously, the microprocessor activates one or more of a set of FET drivers which are connected to others of its drive pins and the windings of the selected motor. As a result, a voltage proportional to the power supply voltage is impressed across one or more windings of the selected motor.

The frequency response switch includes a filter circuit connected in series with an integrating circuit.

In one embodiment of the present invention, a low pass, a bandpass and a high pass filters are used.

FIGS. 5A-5E show an alternate (digital) multiplexing scheme. The circuitry includes a plurality (9) multiplexing drivers for driving a matrix print head and control a plurality (4) of motors (two at a time). The multiplexing is achieved by the microprocessor generating a two-bit logic signal which is converted to four logic signals by a two-to-four (2-4) decode circuit. Selected ones of the decoded signals are coupled by a level translator to an FET switch which selects which one of the motors or print heads is active.

These and other objects and advantages of this invention will be more fully described in the accompanying drawings.

BRIEF DESCRIPTION OF THE DRAWINGS

FIGS. 5, 5A-5E shows an alternate embodiment of a controller according to the teachings of the present invention.

DETAILED DESCRIPTION

Figure 1:
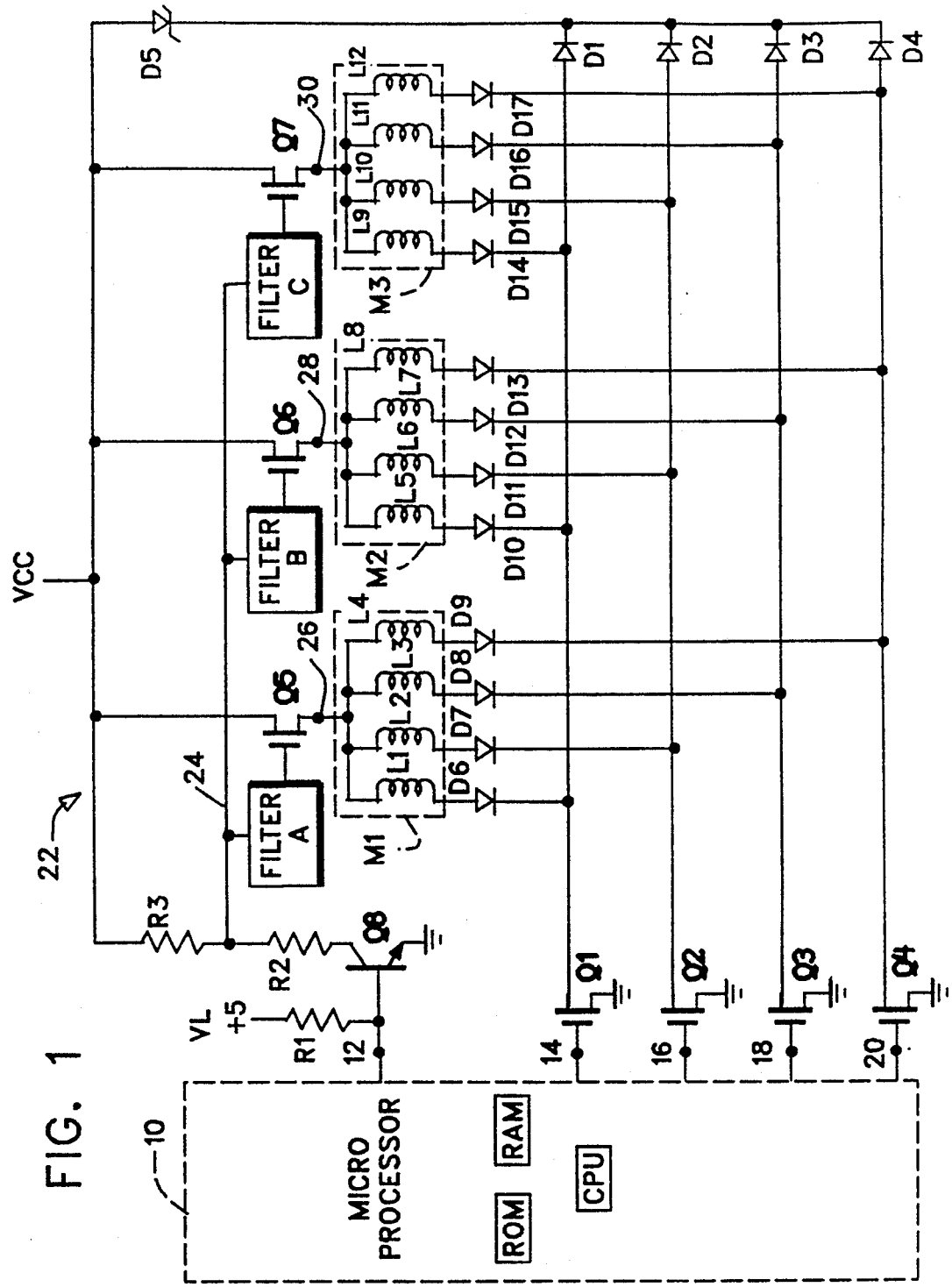
FIG. 1 shows a circuit diagram of the controller according to the teachings of the present invention.

FIG. 1 shows a circuit diagram of the motor controller according to the teachings of the present invention. The motor controller could be used for controlling motors and/or a print head in a printer used with a Point of Sale system such as the IBM ® 4680 Point of Sale system. The motor controller includes a device such as microprocessor 10, which generates "motor selection signal" on node or pin 12 and "motor drive signals" on pins identified by numerals 14, 16, 18 and 20. The circuit arrangement 22 multiplexes the motor selection signal of pin 12 to select one of a plurality of motors M1 through Mn. It should be noted that only three of the motors M1, M2 and M3 are shown in the figure. However, the showing in the figure is only exemplary and should not be construed as a limitation on the scope of the invention; since it is within the skill of one skilled in the art to extend the teachings of this invention to drive more or less than three motors. Also, the motors could be polyphase motors with multiple windings such as L1-L4, L5-L8 and L9-L12. The motors could be those used in printers for driving a multiplicity of paper functions. A common set of drivers Q1-Q4 uses the motor drive signals on pins 14, 16, 18, 20 to energize the coils of the selected motor. A common set of devices D1-D5 provides a common return path for discharging the motor coils. The diodes D1-D4 and D6-D17 act as blocking diodes to eliminate cross-talk between circuits.

Still referring to FIG. 1, the microprocessor 10 is a conventional microprocessor having a ROM, RAM and CPU. The ROM is programmed with a motor control program which generates the appropriate signals on each pin of the microprocessor. The microprocessor is programmed so that the motor selection signal on pin 12 is a multi-frequency signal. As will be explained subsequently, each of the motors M1, M2 and M3 is coupled to pin 12 by a frequency switching mechanism which responds to a preassigned frequency range of the multi-frequency signal on pin 12. This being the case, when the associated frequency switch senses frequency within its assigned range, it outputs a signal which activates the motor to which it is connected. Thereafter, each coil or groups of coils within the motor is driven (that is, energized) by motor drive signals on pins 14, 16, 18, 20.

Still referring to FIG. 1, pin 12 is connected through R1 to a relatively low voltage signal source $V_L$. A translation voltage device Q8 has its base electrode connected to pin 12 and its collector electrode is connected by voltage dividing network (R2, R3) to a supply voltage $V_{CC}$.

A plurality of filtering means identified by alphabetical characters A, B and C are connected to node 24. The output from each of the filtering means is connected to the gate electrode of FET device Q5, Q6 and Q7. The source electrode of each of the FET devices Q5, Q6 and Q7 is coupled to $V_{CC}$. The drain electrode of FET device Q5 is coupled to output node 26. The drain electrode of device Q6 is connected to output node 28 and the drain electrode of FET device Q7 is connected to output node 30. As will be explained subsequently, output node 26, 28 and 30 are the nodes to which the coils for motor M1, M2 and M3 are connected.

Still referring to FIG. 1, the function of filtering means A, B and C is to sense when the microprocessor selection signal, on pin 12, is within their assigned range of frequencies and to output a DC signal on the gate electrode of Q5, Q6 or Q7 to turn on the device. Whichever device is turned on is the motor which is selected. To effectuate this result, each of the filtering means A, B and C respond to a different range of frequencies. In the preferred embodiment of this invention, the filtering means A respond to frequencies in the relatively low frequency range. Therefore, a low pass filter will suffice to generate the signal which is used to activate device Q5. Similarly, filtering means B responds to signals with frequencies in the middle frequency range. Therefore, a bandpass filter is used to activate device Q6. Finally, filter means C responds to signal in the high frequency range. Therefore, a high pass filter is used to activate device Q7.

Figure 3:
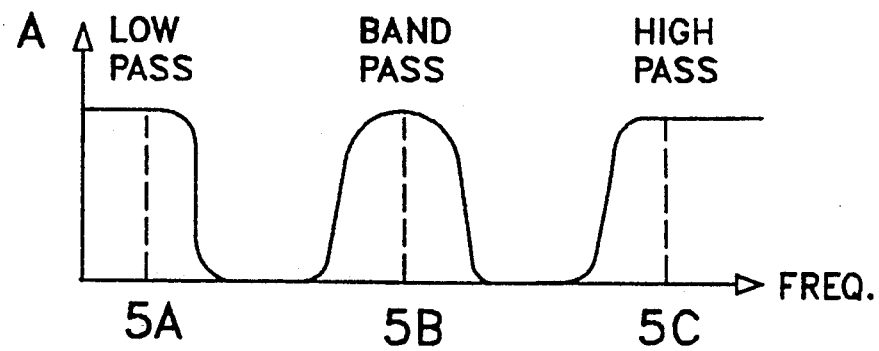
FIG. 3 shows a graphical representation of the frequency range to which each filter is responsive.

Turning to FIG. 3 for the moment, a graphical sketch of the frequency spectrum that activates the filters is shown. In the sketch, frequency (F) is plotted against amplitude. $F_A$ identified the frequency range which activates filtering means A. Similarly, $F_B$ identifies the frequency range that activates filter means B. Finally, $F_C$ identifies the frequency range that activates filter means C.

Figure 4:
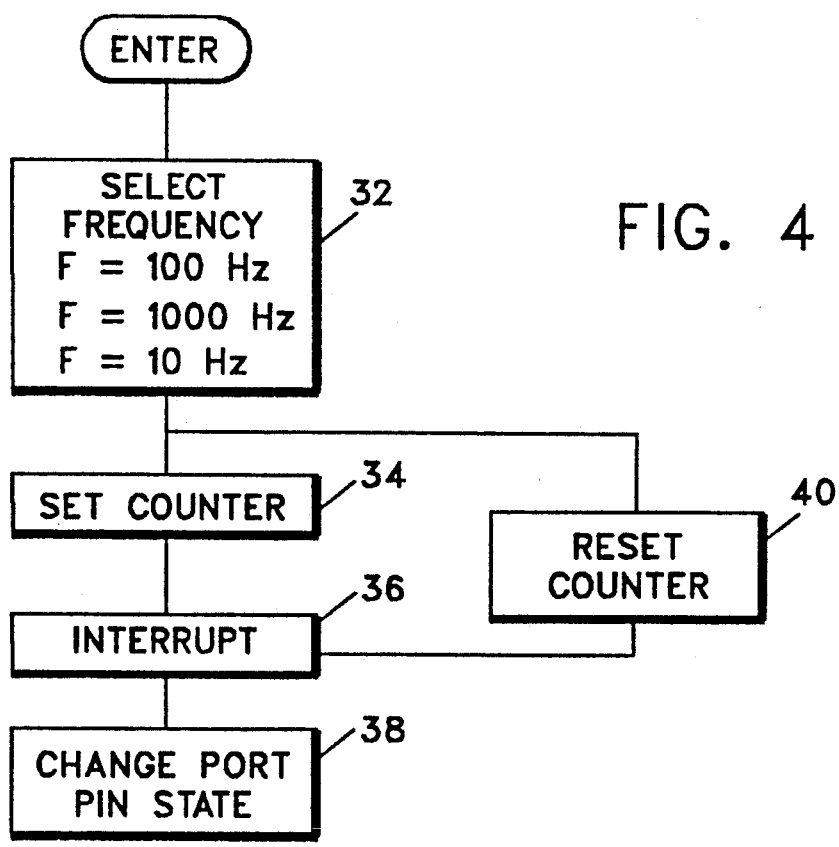
FIG. 4 shows a flow chart of a program for changing the frequency on a port pin of the microprocessor.

FIG. 4 shows a flow chart of a program which controls microprocessor 10 to change the frequency on port pin 12 (FIG. 1). The microprocessor 10 generates the frequencies required to select the proper motor. Each of the filters (low, bandpass, and high) is designed with a wide separation of the frequencies that it passes. This is done to decrease the dependance of the processor to generate a highly accurate signal. With this fact in mind, the microprocessor 10 uses an internal hardware timer or counter (standard to all processors) to set and reset the microprocessor port pin 12 at a desired frequency. For the low pass filter, the program selects 100 Hz from block 32 and loads it into the timer (block 34). The timer would be set to generate a 100 Hz signal at the port pin. When the timer times out, an interrupt (block 36) is generated, the counter is reset (block 40) and the state at the port pin is changed (block 38). If a higher interrupt occurs during this time, it will be serviced first. This will cause a slight change in the base frequency used for the multiplexing scheme network. However, as indicated above, using a wide separation of filter frequencies will eliminate the need for an accurate frequency from the processor.

Figure 2A:
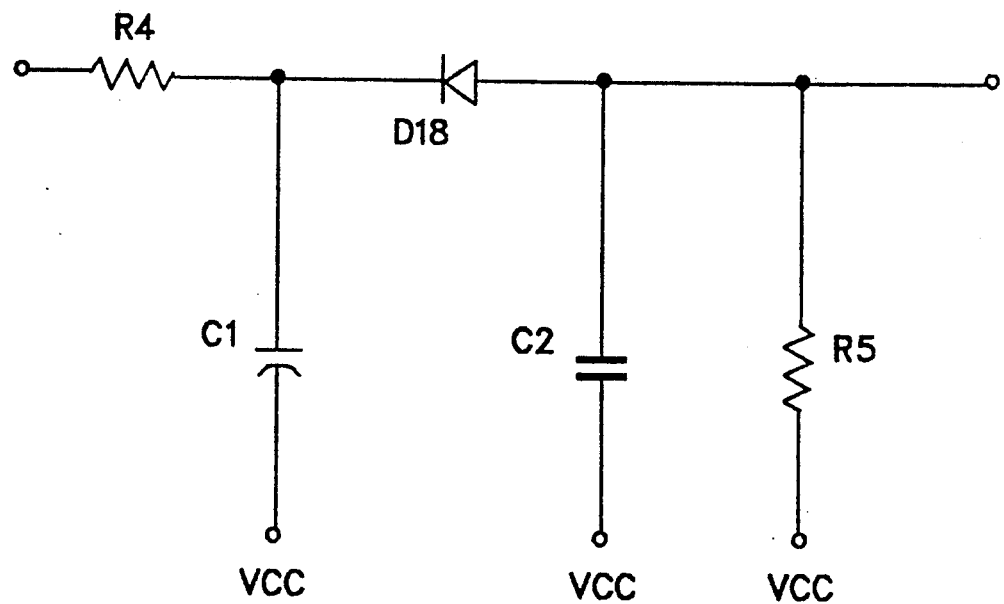
FIGS. 2A and 2B show circuit diagrams for low pass, high pass and integration circuits.
Figure 2B:
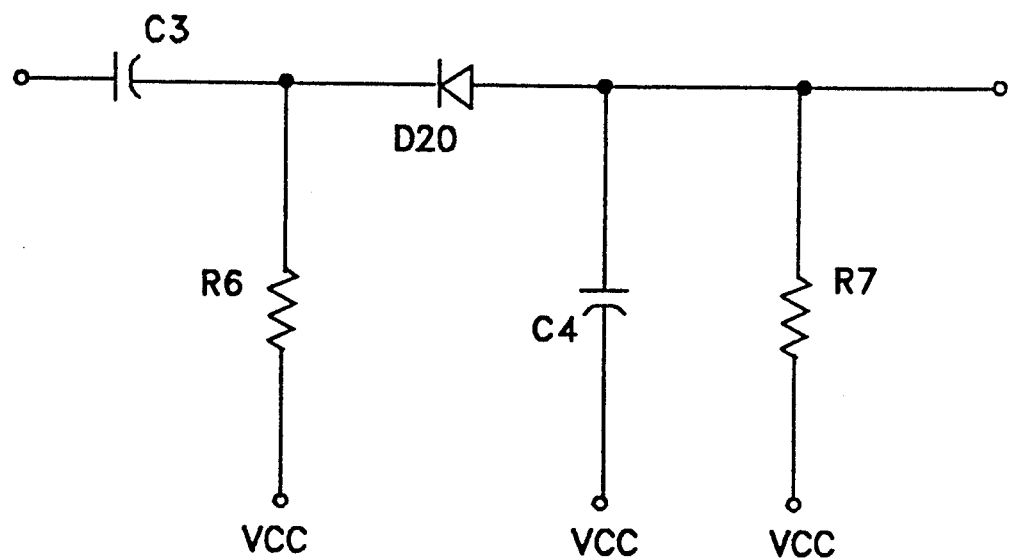

FIGS. 2A and 2B show typical filters which can be used. FIG. 2A shows a low pass filter formed from components R4 and C1. The output of the filter is connected to an integrator formed by devices D18, C2 and R5.

FIG. 2B shows a circuitry for filtering means C. The circuit includes a high pass filter which is formed by components C3 and R6. The high pass filter is connected to an integrator formed by components D20, C4 and R7.

With reference to the circuit in FIGS. 2A and 2B, each filter outputs a signal when it senses its assigned frequency range. The signal is integrated by the integrator to generate a DC signal which is applied to the gate electrode of one of the motor drive devices Q5, Q6 or Q7.

Referring again to FIG. 1, FET devices Q1, Q2, Q3 and Q4 are the motor drivers. Each of the devices has its gate electrode connected to one of the microprocessor output terminals 14, 16, 18 and 20. The source electrode of each FET device is connected to a ground potential and the drain electrode of each device is connected through respective diodes to one of the coils in the motor. The structure is such that each motor has a coil which is connected to each of the common motor drive devices Q1, Q2, Q3 and Q4. The structure is such that if motor M1 is selected, each of the coils or groups of coils L1-L4 can be driven individually by device Q1 or Q2 or Q3 or Q4. Whichever coil is selected, the diodes in the other coils prevent interaction from the coil which is activated. A common return path including devices D1, D2, D3, D4 and D5 interconnects the respective coil in each motor through D5 to a VCC. The return path serves to discharge energy in an energized coil when its associated driver FET is turned off.

With reference to FIG. 1, if motor M1 is to be driven, the translation device Q8 is driven by the microprocessor at a given pulse rate, say 100 Hz. Filter A is designed to pass frequencies at and below 100 Hz. Thus, the 100 Hz signal will pass and be integrated by the diode/capacitive part of the filter means. The resultant signal will be a DC voltage large enough to bias device Q5 which selects motor M1 for operation. Once the motor is selected, motor drive signals are applied to devices Q1-Q4 to energize the coils of the selected motor M1.

To drive motor M2, Q8 would now be driven at a different rate, say 1000 Hz. Filter B would now pass a signal to the diode/integrator circuit whereas filters A and C would not pass a signal to the integrator part of the filter circuit since filter A will only pass 100 Hz signals and filter C will only pass signals at a higher rate, say 10,000 Hz. It should be noted that by selecting the frequency range far apart, the frequency outputted from microprocessor need not be extremely accurate.

It should be noted that for adding additional motors only a single additional multiplexing driver is needed since the drivers Q1-Q4 is multiplexed to drive any number of motors. By multiplexing the signals, fewer numbers of microprocessor pins are needed and less high current drivers are required.

FIGS. 5A-5E show a multiplexing device for driving the print head 44 and a plurality of motors identified by numerals 46, 48, 50 and 52. The motors could be used for driving a cutter assembly, journal receipt spool, customer receipt spool, etc. In the figure, the motors are driven in pairs. Thus, motors 46 and 48 (FIG. 5E) form a pair which is driven continuously and motors 50 and 52 (FIG. 5C) form another pair which can be driven simultaneously. It should be noted that other configuratioins can be generated without deviating from the spirit or scope of the present invention.

Figure 5B:
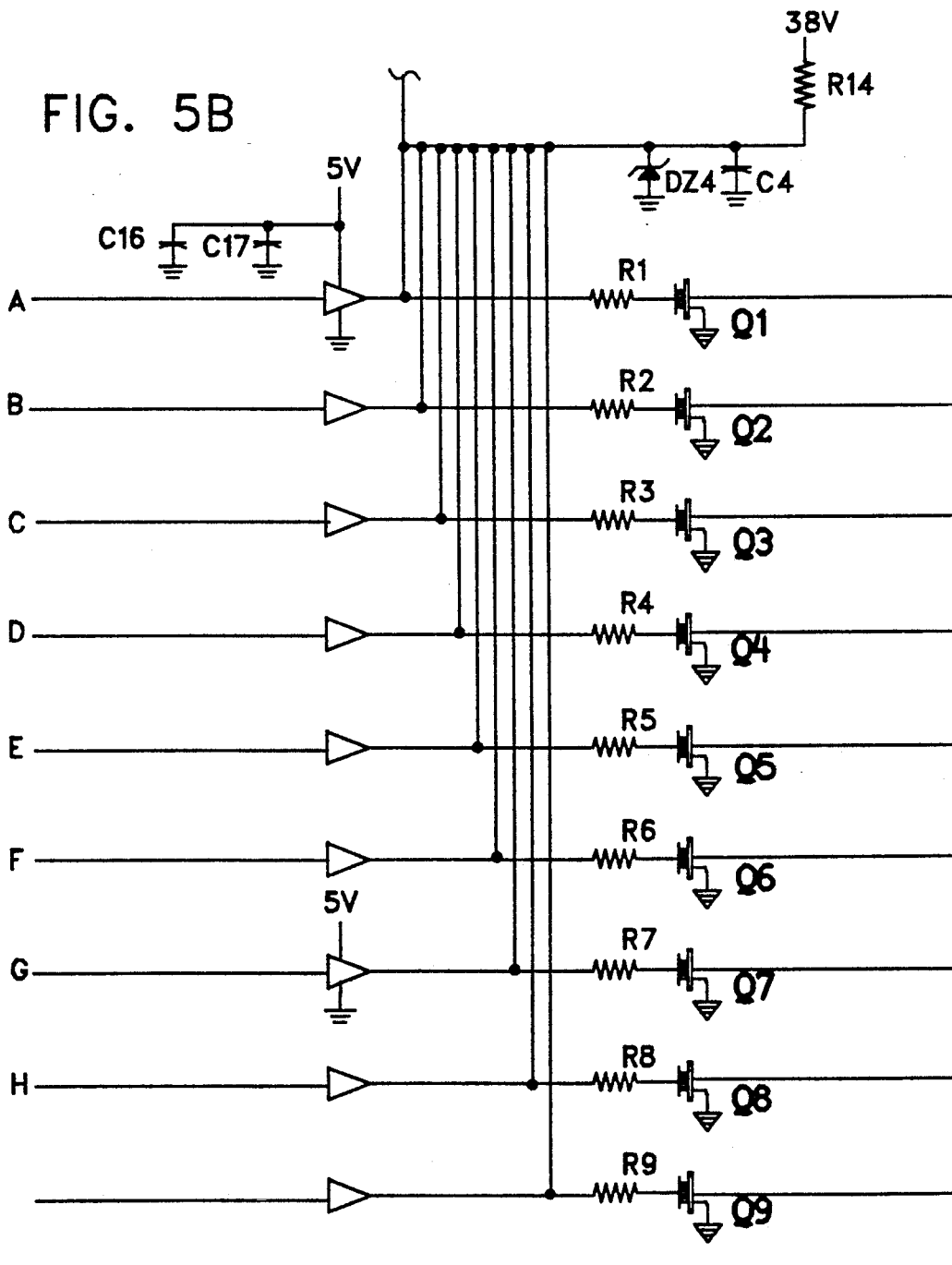
Figure 5C:
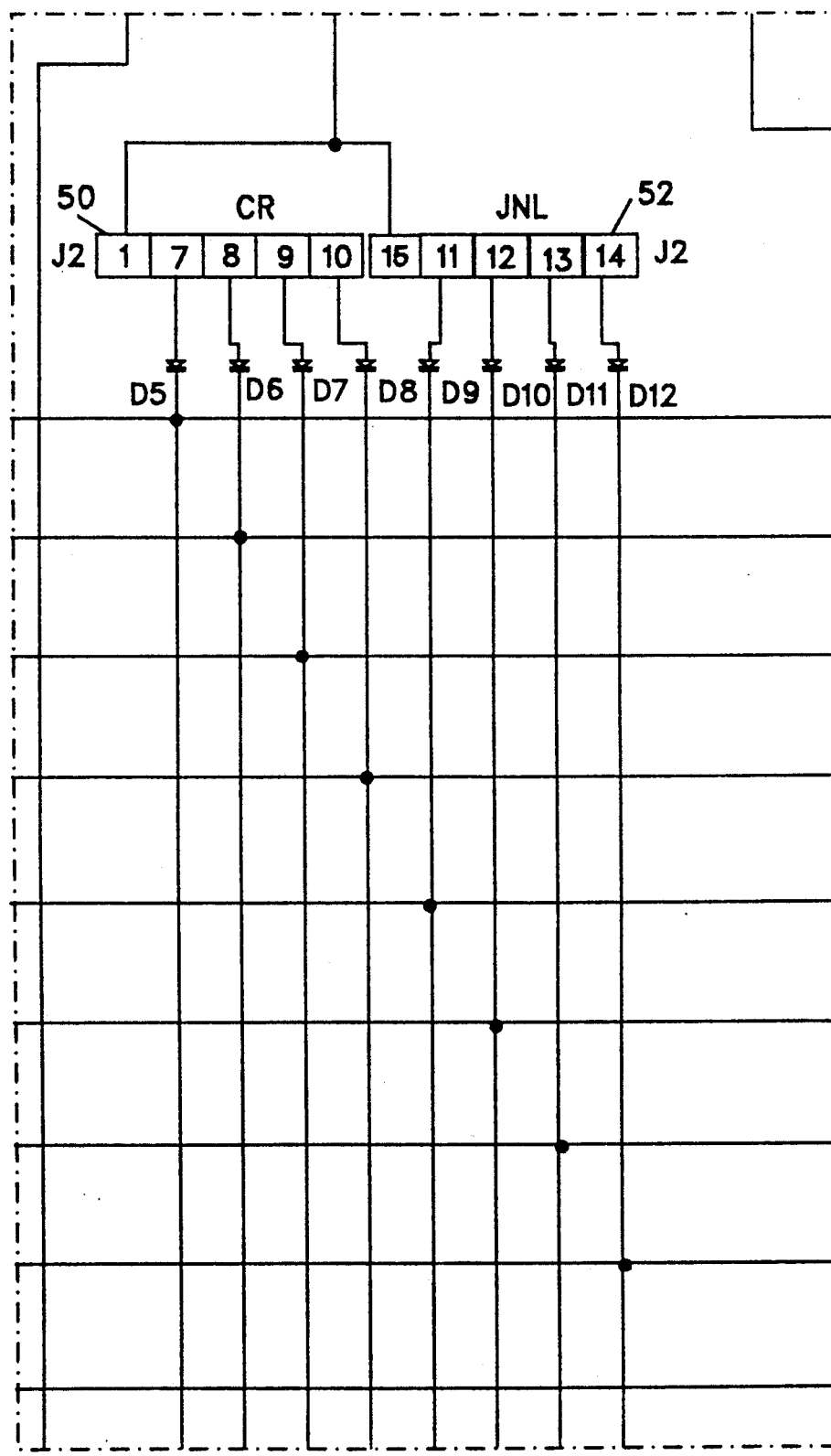
Figure 5D:
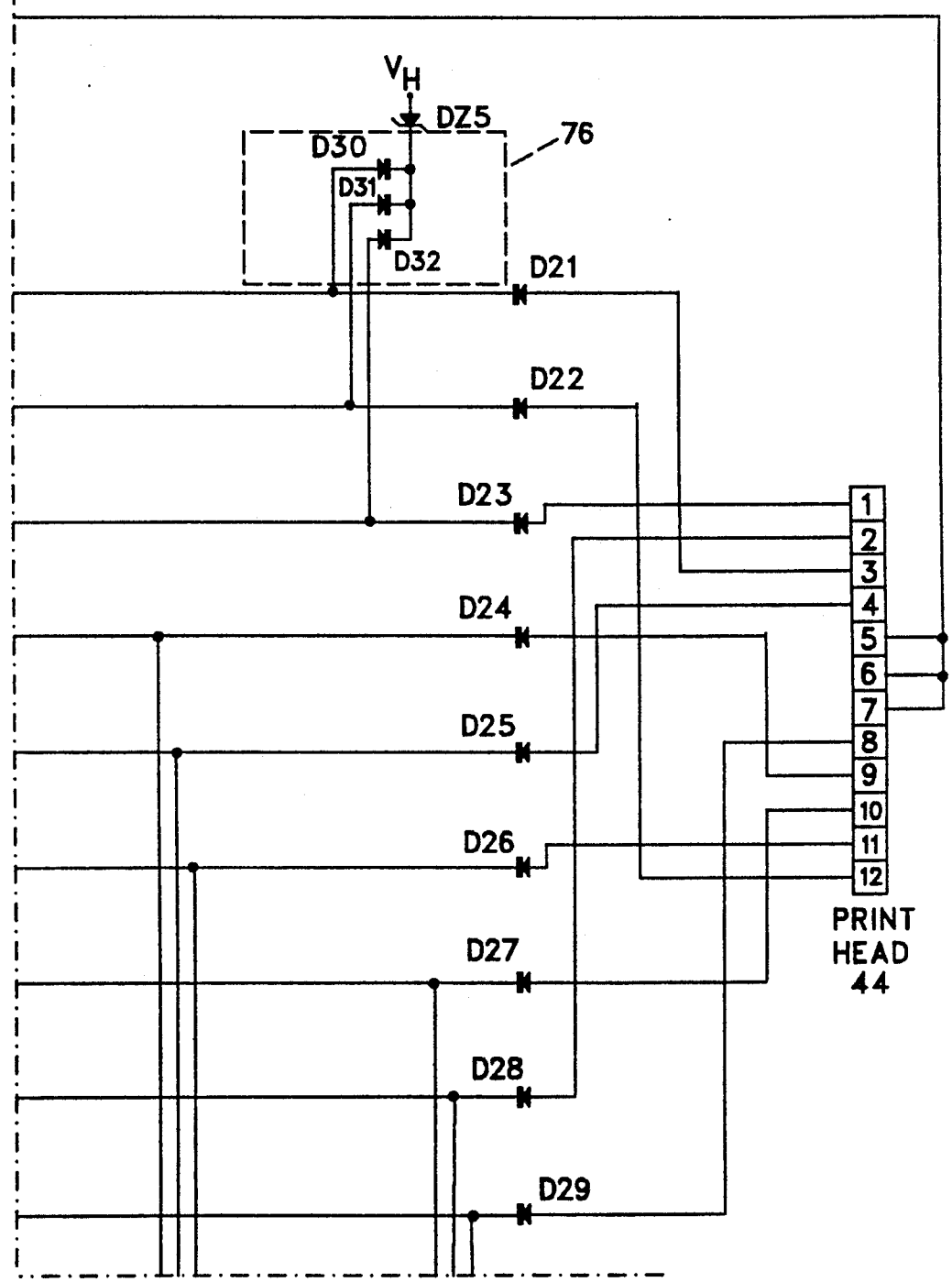
Figure 5E:
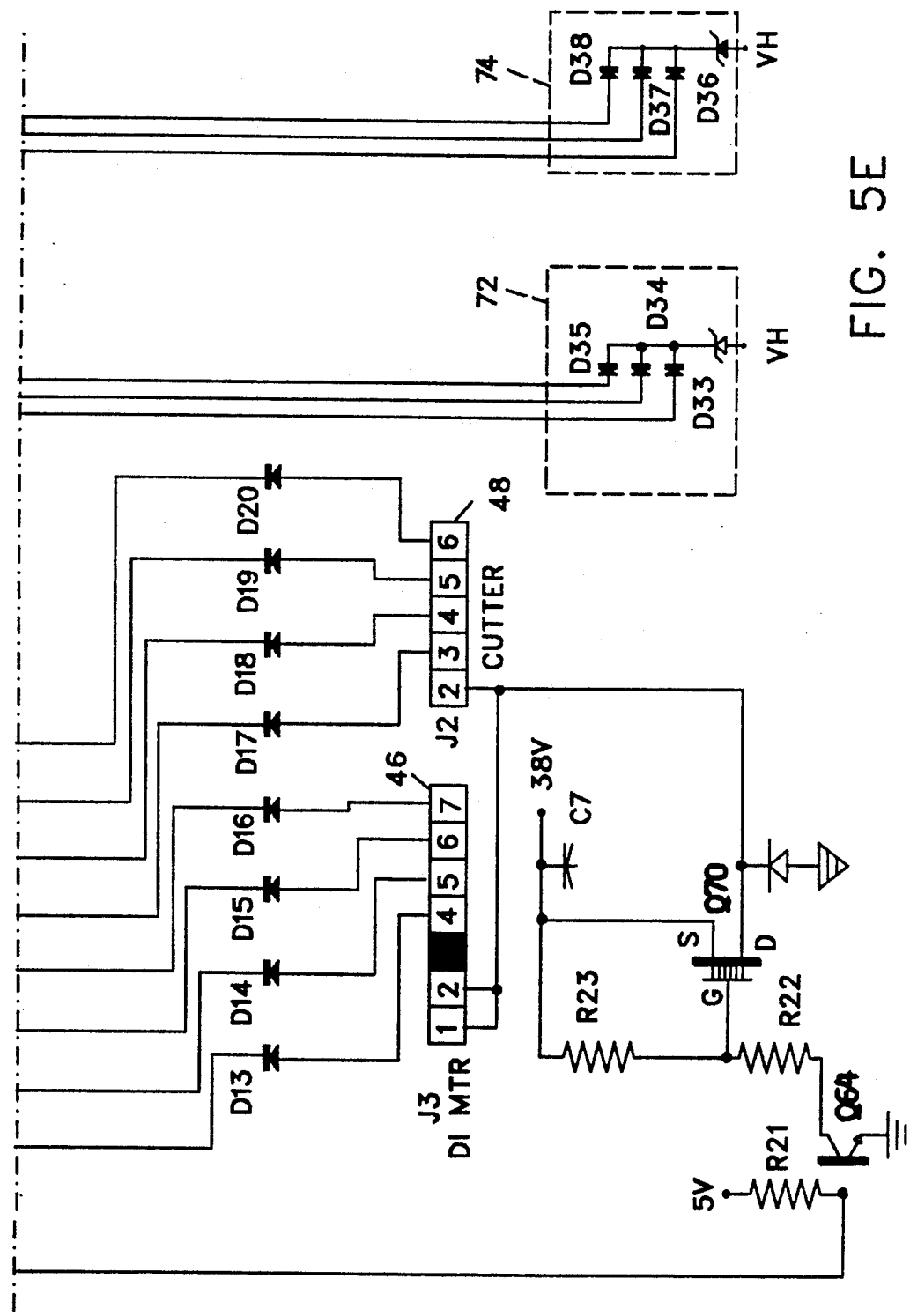

Still referring to FIG. 5A, the multiplexing device interfaces the print head and motors to the microprocessor controller 54. The multiplexing device includes a decoder module 56 interconnected by a plurality of signal lines to an inverter module 58 whose individual outputs are coupled via level converters Q60, Q62 and Q64 to FET drivers Q66, Q68 and Q70 (FIG. 5E). When activated, each FET driver selects (i.e., energizes) a pair of motors or the print head. As stated previously, each motor has four coils or phases which are energized or controlled separately. To provide this control, each motor coil (not shown) is coupled by a conductor via a FET device, a resistor and buffer to dedicated microprocessor pins (a-h, FIG. 5B). A plurality of diodes are connected so as to block the flow of current into non-selected motor or head elements. The print head is a nine wire head and each wire is connected through conductors, a common FET device, resistor and buffer to selected microprocessor pins. Three diode networks identified by numerals (72, 74 and 76) generate appropriate discharge paths for the motor and print head coils. In a preferred embodiment of the invention, $V_H$ is approximately 38 volts.

The circuit arrangement of FIG. 5 works as follows:
1. The u-processor generates a 2 bit code on pins labeled MPX-A and MPX-B. With two bits, 4 unique codes (00, 01, 10, 11) can be generated.
2. These signals are fed into a 2-4 decode module 56. Depending on the 2 bit code from the u-processor, one of four outputs will be activated (pins 2, 4, or 6). Note only 3 of the 4 output pins are used since we are only controlling 3 drivers.
3. The outputs of the 1-4 decode module are inverted in polarity by module 58. This inverter sets the signals properly for driving one of three level converters/switch circuits (Q60 and Q66, Q62 and Q68 or Q64 and Q70).
4. Q60, Q62 and Q64 act as level converters which convert a 0-5 volt signal to a 38-27 volt signal which is required by switches Q66, Q68 and Q70.
5. Q66, Q68 and Q70 act as switches for applying 38 volts to one of three circuits; print head 55, motor 50 and 52 or document insert (DI) and cutter paper motors 46 and 48. When a particular switch is activated, the appropriate drive signals for controlling a motor or print head is generated by u-processor pins and outputted on selected microprocessor pins.

While the invention has been particularly shown and described with reference to the preferred embodiment thereof, it will be understood that various changes in form and details may be made therein without departing from the spirit and scope of the invention.

I claim:
1. A controller for driving motors of a printer comprising:
 a control means for generating a multi-frequency select signal on one of its output pins and at least one drive signal on at least another of its output pins;

a frequency discriminating means coupled to said one of its output pins; said frequency discriminating means being responsive to a range of frequencies outputted in the select signal to generate discrete signals which activate selected ones of said motors for selected frequency bands within said range of frequencies;

at least one switch means interconnecting an energization coil in the selected ones of said motors to said at least another of its output pins; and a discharge means coupled to the energization coil in the selected one of said motors said discharge means discharging said energization coil.

2. The controller of claim 1 wherein the control means includes a microprocessor programmed to generate the select signal and the drive signal.

3. The controller of claim 1 wherein the frequency discriminating means includes:
a voltage translator device;
a plurality of filtering/integrator circuit arrangements coupled to said voltage translator device; and
a plurality of switching devices, one of each being coupled to a selected one of the plurality of filtering/integrator circuit arrangements.

4. The controller of claim 3 wherein the voltage translator device includes a transistor.

5. The controller of claim 3 wherein the filtering/integrator circuit arrangements includes a low pass filter, a bandpass filter and a high pass filter, coupled to an integrator.

6. The controller of claim 3 wherein the switching devices include FETs.

7. The controller of claim 1 wherein the at least one switch means includes an FET device.

8. The controller of claim 1 wherein the discharge means includes a simplex diode connected in series with a Zener diode.

9. The controller set forth in claim 1 further including:
a power supply; and
a voltage dividing network interconnecting the power supply to the frequency discriminating means.

10. The controller of claim 9 wherein the voltage dividing network includes a pair of series connected resistors.

11. A circuit arrangement for interfacing a motor controller to control a plurality of motors, comprising:
an input node for receiving a multi-frequency select signal;
a voltage translation means coupled to said input node;
a plurality of filtering/integrator circuit arrangements coupled to the voltage translation means, with each filtering/integrator circuit arrangement being responsive to a range of frequencies within the multi-frequency select signal to generate a dc signal when the range of frequencies is sensed;
a plurality of select switching devices, one of each being responsive to an assigned dc signal from one of said plurality of filtering/integrator circuit arrangements, and having an output node for generating an output selection signal coupling to a selected one of the motors;
a plurality of drive circuit means, each drive circuit means having an input node for receiving a drive signal and an output node for generating an output drive signal coupling to assigned coils of the motors; and
a common return circuit arrangement interconnecting the plurality of drive circuit means to a voltage supply.

12. The circuit arrangement of claim 11 wherein said plurality of motors being a plurality of stepper motors, with each motor being interconnecting between the output node of one of the plurality of select switching devices and the output nodes of the plurality of drive circuit means.

13. The circuit arrangement of claim 11 wherein each of the drive circuit means includes an FET device connected to a diode.

14. The circuit arrangement of claim 11 wherein said motor controller having one output which generates the multi-frequency select signal and a plurality of other outputs which generate the drive signals.

15. A circuit arrangement for use in a printer to interface a controller with a plurality of motors, each motor having a plurality of coils, comprising:
logic means, responsive to coded signals outputted from the controller, to generate a plurality of selection signals with each selection signal being operable to select a set of motor coils;
at least one switch means responsive to the selection signals and operable for adjusting the selection signals to a desired signal level;
at least one selection energization means, responsive to one of the adjusted selection signals and operable for activating one set of motor coils; and
a plurality of control energization means, responsive to control signals outputted by the controller, and operable for controlling one selected coil in said one set of motor coils.

16. The circuit arrangement of claim 15 wherein the logic means include a 2-4 bit decoder module.

17. The circuit arrangement of claim 15 wherein the switch means includes a transistor switch.

18. The circuit arrangement of claim 15 wherein the selection energization means includes an FET device.

* * * * *